US006546428B2

(12) United States Patent
Baber et al.

(10) Patent No.: US 6,546,428 B2
(45) Date of Patent: Apr. 8, 2003

(54) METHODS, SYSTEMS AND COMPUTER PROGRAM PRODUCTS FOR TRANSFERRING A FILE USING A MESSAGE QUEUE

(75) Inventors: Stephen B. Baber, Raleigh, NC (US); Kathryn H. Britton, Chapel Hill, NC (US); John R. Hind, Raleigh, NC (US); Barron C. Housel, III, Chapel Hill, NC (US); Ajamu Akinwunmi Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 09/837,091

(22) Filed: Apr. 18, 2001

(65) Prior Publication Data

US 2002/0013853 A1 Jan. 31, 2002

Related U.S. Application Data

(62) Division of application No. 09/192,128, filed on Nov. 13, 1998, now Pat. No. 6,279,041.

(51) Int. Cl.[7] ............................................... G06F 15/16

(52) U.S. Cl. ....................... 709/232; 709/230; 709/231; 709/233; 709/234; 709/235; 709/236; 709/237

(58) Field of Search ................................ 709/230, 231, 709/232–237

(56) References Cited

U.S. PATENT DOCUMENTS

| 4,386,416 A | 5/1983 | Giltner et al. .............. 395/888 |
| 5,121,479 A | 6/1992 | O'Brien ..................... 395/250 |
| 5,261,089 A | 11/1993 | Coleman et al. ............ 395/600 |

(List continued on next page.)

FOREIGN PATENT DOCUMENTS

| CA | 1322607 | 1/1989 |
| JP | 61-41063 | 2/1986 |
| WO | 95/10805 | 4/1995 |
| WO | 97/46939 | 12/1997 |

OTHER PUBLICATIONS

*Applications to Host File Transfer Restart Method*, IBM Technical Disclosure Bulletin, vol. 31, No. 5, pp. 409–410 (Oct. 1988).

(List continued on next page.)

*Primary Examiner*—Moustafa M. Meky
*Assistant Examiner*—Bradley Edelman
(74) *Attorney, Agent, or Firm*—Myers Bigel Sibley & Sajovec; Jeanine S. Ray-Yarletts

(57) ABSTRACT

Method, apparatus and program products for increasing the performance of communications using differencing data communications over a message queue supporting asynchronous communications from a variety of applications executing on a source device over a shared external communication link to destination devices are provided. A data stream between the source device and the destination device is segmented based on the type of the data stream to provide a logical segmentation which increases the occurrence of repeated transmissions of a segment. The segments are then placed in the message queue as a message for transport to a destination computer. Differencing is provided by replacing the segment with an associated identifier for segments which have previously been transported to provide a reduced volume of data for transmittal based on recognition and replacement of data segments which have previously been transmitted by the source device. The destination device receives the transmitted reduced segments as messages in a receive message queue and reconstructs the data stream. Synchronization between the differencing caches of the devices is not required as the communication is asynchronous through a message queue and, if a reduced segment is not recognized, retransmission of the complete segment instead of the associated identifier may be requested and the source device creates and queues the segment as a message.

16 Claims, 9 Drawing Sheets

U.S. PATENT DOCUMENTS

| | | | |
|---|---|---|---|
| 5,269,017 A | 12/1993 | Hayden et al. | 395/575 |
| 5,276,876 A | 1/1994 | Coleman et al. | 395/650 |
| 5,282,207 A | 1/1994 | Jurkevich et al. | 370/110.1 |
| 5,319,773 A | 6/1994 | Britton et al. | 395/575 |
| 5,319,774 A | 6/1994 | Ainsworth et al. | 395/575 |
| 5,371,886 A | 12/1994 | Britton et al. | 395/600 |
| 5,426,645 A | 6/1995 | Haskin | 370/118 |
| 5,428,771 A | 6/1995 | Daniels et al. | 395/575 |
| 5,432,926 A | 7/1995 | Citron et al. | 395/575 |
| 5,446,904 A | 8/1995 | Belt et al. | 395/750 |
| 5,469,503 A | 11/1995 | Butensky et al. | 379/265 |
| 5,500,890 A | 3/1996 | Rogge et al. | 379/91 |
| 5,539,736 A | 7/1996 | Johnson et al. | 370/60 |
| 5,546,582 A | 8/1996 | Brockmeyer et al. | 395/650 |
| 5,551,043 A | 8/1996 | Crump et al. | 395/750 |
| 5,561,797 A | 10/1996 | Gilles et al. | 395/600 |
| 5,581,704 A | 12/1996 | Barbara et al. | 711/141 |
| 5,581,753 A | 12/1996 | Terry et al. | 711/141 |
| 5,592,512 A | 1/1997 | Spiess | |
| 5,594,910 A | 1/1997 | Filepp et al. | 395/800.28 |
| 5,611,038 A | 3/1997 | Shaw et al. | 395/806 |
| 5,613,060 A | 3/1997 | Britton et al. | 395/182.13 |
| 5,666,399 A | 9/1997 | Bales et al. | 379/419 |
| 5,682,514 A | 10/1997 | Yohe et al. | 711/118 |
| 5,706,435 A | 1/1998 | Barbara et al. | 711/141 |
| 5,724,581 A | 3/1998 | Kozakura | 707/202 |
| 5,734,898 A | 3/1998 | He | 707/203 |
| 5,751,719 A | 5/1998 | Chen et al. | 370/473 |
| 5,754,774 A | 5/1998 | Bittinger et al. | 395/200.33 |
| 5,758,072 A | 5/1998 | Filepp et al. | 395/200.5 |
| 5,758,174 A | 5/1998 | Crump et al. | 395/750.05 |
| 5,765,004 A | 6/1998 | Foster et al. | 395/750.05 |
| 5,768,538 A | 6/1998 | Badovinatz et al. | 395/200.78 |
| 5,781,908 A | 7/1998 | Williams et al. | 707/104 |
| 5,787,470 A | 7/1998 | DeSimone et al. | |
| 5,802,267 A | 9/1998 | Shirakihara et al. | 395/182.13 |
| 5,813,032 A | 9/1998 | Bhargava et al. | |
| 5,832,508 A | 11/1998 | Sherman et al. | |
| 5,878,213 A | 3/1999 | Bittinger et al. | 709/203 |
| 5,909,569 A * | 6/1999 | Housel et al. | 703/21 |
| 5,931,904 A * | 8/1999 | Banga et al. | 709/217 |
| 6,003,087 A | 12/1999 | Housel, III et al. | 709/229 |
| 6,035,324 A | 3/2000 | Chang et al. | 709/203 |
| 6,073,173 A | 6/2000 | Bittinger et al. | 709/224 |
| 6,148,340 A | 11/2000 | Bittinger et al. | 709/224 |
| 6,401,136 B1 * | 6/2002 | Britton et al. | 709/314 |
| 6,434,623 B1 * | 8/2002 | Sasaki et al. | 709/232 |

OTHER PUBLICATIONS

*Synchronous Interleaved I/O File Server,* IBM Technical Disclosure Bulletin, vol. 32, No. 9B, pp. 91–92 (Feb. 1990).
*Client/Server–based File Transmission Checkpoint/Restart Protocol,* IBM Technical Disclosure Bulletin, vol. 38, No. 09, pp. 191–193 (Sep. 1995).
*Combining Presumed Abort Two–Phase Commit Protocols with SNA's Last Agent Optimization;* IBM Technical Disclosure Bulletin, vol. 34, No. 7B, pp. 334–338 (Dec. 1991).
*Efficient Commit Protocol for Shared Nothing Architectures Using Common Log Server,* IBM Technical Disclosure Bulletin, vol. 36, No. 12, pp. 65–66 (Dec. 1993).
Jacob Ziv, Abraham Lempel; *Compression of Individual Sequences via Variable–Rate Coding,* IEEE Transactions on Information Theory, vol. I–24, No. 5, Sep. 1978.
Jacob Ziv, Abraham Lempel; *A Universal Algorithm Sequential Data Compression,* IEEE Transactions on Information Theory, pp. 337–343, May 1977.
*Emmulation Data Stream,* IBM Technical Disclosure Bulletin, vol. 33, Aug. 1990, pp. 221–223.
*Two–Phase Commit Resynchronization,* IBM Technical Disclosure Bulletin, vol. 39, No. 01, pp. 79–80 (Jan. 1996).

* cited by examiner

METHODS, SYSTEMS AND COMPUTER PROGRAM PRODUCTS FOR TRANSFERRING A FILE USING A MESSAGE QUEUE

RELATED APPLICATIONS

This application is a divisional of application Ser. No. 09/192,128 filed Nov. 13, 1998, now U.S. Pat. No. 6,279,041.

FIELD OF THE INVENTION

The present invention relates to communications between devices over a network. More particularly, the present invention relates to communications over a low-speed or wireless communication link between two computers using a message queue.

BACKGROUND OF THE INVENTION

Traditional mainframe computer configurations provided for user interface to the computer through computer terminals which were directly connected by wires to ports of controllers connected by channels to the mainframe computer. As computing technology has evolved, processing power has typically evolved from a central processing center with a number of relatively low-processing power terminals to a distributed environment of networked processors. Examples of this shift in processing include local or wide area networks which interconnect individual work stations where each workstation has substantial independent processing capabilities. This shift may be further seen in the popularity of the Internet which interconnects many processors and networks of processors through devices such as, for example, routers.

At the same time that processing power was becoming more distributed there was also an increase in the popularity of mobile computing. The use of laptops, notebooks, Personal Digital/Communication Assistants (PDAs/PCAs) and other portable devices has led to an increase in demands for wireless communications. Wireless communication allows a user freedom to move within the wireless environment while remaining "connected" to a network. Furthermore, a wireless connection to a network allows a portable processor user the convenience of connecting to a network without having to plug into a docking station or use some other method of "hardwiring" to a network. However, wireless wide area networks, cellular communications and packet radio, suffer from common limitations such as the high cost per byte of communications, slow response time, low bandwidth and unreliability which all hamper use of wireless technology.

Even outside of the portable processing arena wireless communications have seen an increase in popularity. Thus, as a result of infrastructure limitations, cost or convenience, it is becoming more frequent that a network linking two devices wishing to communicate may include a low throughput component such as a wireless network link.

Communications between devices such as computers are typically disadvantaged particularly on lower through-put network legs, such as wireless legs (or highly congested legs which are effectively bandwidth limited), where bandwidth limitations result in slower response time for communications between the computers. In the extreme, protocol timeouts may even cause transmission errors and resulting retransmissions or even inability of the communication system to operate. Thus, utilizing wireless technology, or any low-speed communication technology, for data communication between applications executing on computers exacerbates the weaknesses of the wireless technology.

Communications are further complicated where a plurality of applications executing on a computer perform operations requiring transmission of data streams over a shared port to an external communication link, on occasion with interruptions in session connections. It is known to provide for this shared access using asynchronous message queuing systems such as International Business Machine Corporation's Message Queuing Series ("MQSeries"), Telecommunications Access Method ("TCAM"), or Information Management Systems ("IMS"), which enable applications to queue data for transport (transmission) to a partner destination computer device on an external communication link such as a network. Using asynchronous message queuing, the external connection between the source computer and the destination computer typically does not have to exist at the time of submission of a data stream message for transmission and the source or sending device is not required to synchronously wait for a response from the destination device. In other words, the transmitting application hands over responsibility for the message to the transport queuing application which takes on responsibility for eventually delivering the queued message. In general, any data object, including messages, files, images, containers, etc., can be transported using a message queuing system.

The message queue transport application reads messages from the queue and sends them to the destination devices over the network. The communication protocol between transmitting and receiving message queues provides for assumption of responsibility over a transmitted message by the receiving device. The source message queue transport application typically then frees the queue space occupied by a message once confirmation is received that the receiving device has assumed responsibility for the message.

OBJECTS AND SUMMARY OF THE INVENTION

In view of the above limitations, it is one object of the present invention to provide for improved performance for data communications in a low-speed communication environment such as wireless communications.

It is a further object of the present invention to support such communications where the communicating applications may be only intermittently connected.

It is an additional object of the present invention to support such communications where the external communication link used for communication is shared by different applications.

In view of these and other objects, the present invention provides methods, systems and computer program products supporting differencing data communications using a message queue supporting asynchronous communications from a variety of applications executing on a source device over a shared external communication link to destination devices. At least one segment of a data stream between the application on the source device and an application on the destination device occurs over an external communication link. The present invention provides increased communications performance by combining data stream differencing with asychronous message transmission control using a message queue. The data stream is segmented based on the type of the data stream to provide a logical segmentation which increases the occurrence of repeated transmissions of a segment. Each segment is then placed in the message queue as a message for transport to a destination computer. Differencing is provided by replacing the segment with an associated identifier for segments which have previously been transported to provide a reduced volume of data for transmittal based on recognition and replacement of data segments which have previously been transmitted by the source device.

The intercept system on the receiving end at the destination computer receives the transmitted reduced segments as messages, expands the reduced segments and writes the expanded segments to a receive message queue. Segments are read from the receive message queue and combined to form the reconstructed data stream. The reconstructed data stream is then provided to the target application on the destination computer. By providing protocol conversion at both ends of the external communication link, the applications may continue to operate without any need to recognize the protocol differencing conversion provided by the present invention. Furthermore, synchronization is not required between the devices as the message queue provides asynchronous communications and, if a reduced segment is not recognized, retransmission of the complete segment using the segment identifier may be requested and the source device creates and queues the segment as a message.

In one embodiment of the present invention, a method is provided for differencing data communications using a message queue. A data stream having an associated type is intercepted (received) from a host application prior to transmission of the data stream through the message queue on an external communication link to a destination computer. The data stream is segmented based on the associated type to provide a plurality of segments. Message identifiers associated with the plurality of segments are then placed into the message queue. The transport system then selects one of the plurality of segments from the message queue for transport and determines if the selected segment has previously been transported. the selected segment is reduced to a differenced communication format based upon whether it has previously been transported to provide a reduced segment and emitted. After verifying that the differenced communication format of the reduced segment was known to the destination computer, the selected segment is dequeued and placed in a differencing cache if it has not previously been transported. The message identifiers associated with the plurality of segments may be the associated segments themselves or they may be pointers to a location in memory where associated segments can be found.

In one embodiment of the present invention, the system determines if the segment has previously been transported and placed in the differencing cache by first calculating an identifier for the selected segment such as a data signature based on the content of the segment (e.g. a CRC). Based on the calculated identifier, the system determines if the selected segment corresponds to a segment saved in the differencing cache. Dequeuing a message operations may include placing the identifier of the selected segment in a differencing index and the system determines if the segment has previously been transported by determining if the identifier of the selected segment is in the differencing index. A pointer may also be placed in the differencing index enabling the selected segment to be located in the differencing cache. The differencing index is preferably associated with a least recently used list and a least recently used segment is removed from the differencing cache and the differencing index if the differencing cache exceeds a size criteria. In one embodiment of the present invention, reducing a segment includes replacing the selected segment with the identifier associated with the selected segment to provide the reduced segment if the selected segment has previously been emitted and providing the selected segment as the reduced segment if the selected segment has not previously been emitted.

In a further embodiment of the present invention, the message queue receives messages from a plurality of data streams and asynchronously emits (transmits) the messages on the external communication link. The messages may be emitted in a first in first out sequence from the message queue and the message queue may have an associated maximum message size.

In another embodiment of the present invention, a message is received from the destination computer indicating whether the destination computer had a segment in memory corresponding to the emitted identifier. The selected segment rather than the identifier associated with the selected segment is emitted if the received message indicates that the destination computer did not have a segment in memory corresponding to the emitted identifier.

In a further embodiment of the segmenting operations of the present invention, an associated type of the data stream is determined. A rule set is selected for segmenting the data stream based on the determined type and the selected rule set is applied to segment the data stream. The associated type of the data stream may be determined based on the data stream. In one embodiment, the associated type is a MIME type.

In another aspect of the present invention, the destination computer receives the emitted reduced segment and reconstructs the selected segment from the received reduced segment. The reconstructed selected segment is placed in a received message queue. The data stream is then reconstructed responsive to the received message queue. The destination computer determines if the reduced segment contains the selected segment and then determines if a segment associated with the reduced segment is available to the destination computer if the reduced segment does not contain the selected segment. The reduced segment is replaced with the segment associated with the reduced segment if available. Otherwise, a message is emitted to the device from which the reduced segment is received requesting transmission of the selected segment if the segment associated with the reduced segment is not available. Data stream reconstruction may include integrating segments from the received message queue into objects. The reconstructed selected segment may be dequeued from the received message queue after providing the reconstructed selected segment to the reconstructing step. The destination computer may provide a differencing index and differencing cache in a manner analogous to that described for the source computer.

In a further aspect of the present invention, a method is provided for transferring a file from a source computer to a destination computer using a message queue. A current version of the file is copied to a file cache responsive to a file transfer request and file segments are defined associated with the current version. The source computer determines if previous versions of the file having associated file segments are available to the source computer and if the destination computer has one of the previous versions of the file available. A first file segment of the current version is compared with the associated file segments of the previous version and a message identifier for the first file segment is placed in the message queue to request transfer of the first file segment if no matching associated file segments of the previous version are located. Otherwise, a match indication is placed in the message queue for transfer if a matching associated file segment is located.

In one embodiment of the file transfer aspects of the present invention, an identifier is calculated for each of the file segments associated with the current version and the calculated identifiers are placed in a segmenting index. The calculated identifiers are compared to a reference identifier based on one of the associated file segments of the previous version and comparison operations continue until either a match is located or all the associated file segments have been tested. Comparing operations are preferably repeated for each of the file segments of the current version to be transferred. In one embodiment, an identifier is calculated for each of the file segments associated with the current version. A segment length for each of the file segments is also calculated and placed in the segmenting index associated with the calculated identifiers.

In a further embodiment of the file transfer aspects of the present invention, an identification of the previous version of the file is transmitted to the destination computer. A message is then received from the destination computer containing an indication of whether the previous version of the file is available to the destination computer. Furthermore, when a plurality of previous versions are available to the source computer, the identifications of the plurality of previous versions are transmitted to the destination computer and the message received from the destination computer contains an indication of one of the plurality of previous versions of the file which is available to the destination computer. This one of the previous version is then used for comparing operations to provide a differenced communication file transfer to the destination computer.

As will be appreciated by those of skill in this art, while the the above described aspects of the present invention have primarily been discussed as methods, they may also be provided as systems or as computer program products.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods, devices (systems) or computer program products. Accordingly, the present invention may take the form of an entirely hardware embodiment, an entirely software embodiment or an embodiment combining software and hardware aspects.

Figure 1:
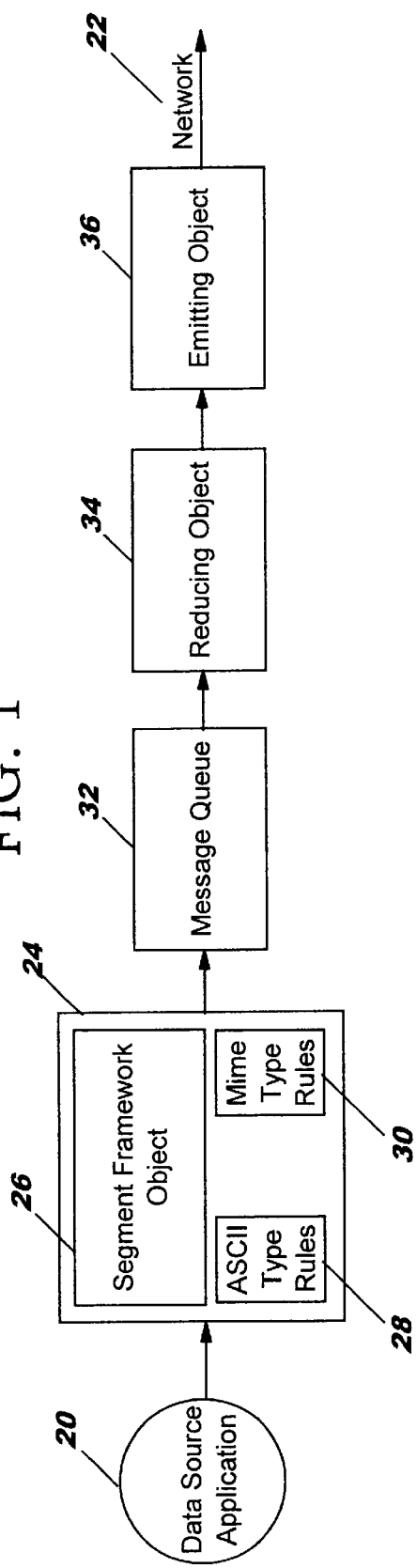
FIG. 1 is a block diagram of a communication system for differencing data communications from the source device perspective according to an embodiment of the present invention.

An embodiment of the present invention will now be described with reference to the block diagram illustrations of FIG. 1 and FIG. 2 which show the source and destination device respectively. Referring first to FIG. 1, a data source application 20 executing on a source device such as a computer generates a data stream to be communicated over an external communication link such as a network 22. The stream from source 20 is provided to segment object 24. Segment object 24 includes a segment framework object 26 as well as a variety of segmenting rule objects for different types of data streams including the illustrated ASCII type object 28 and other MIME type object 30. A variety of different type objects may be provided for different applications such as terminal emulators, e-mail applications, word processors, etc., each of which is configured to interface and communicate with segment framework object 26 to provide segment processing by segment object 24 based on the associated data type of an incoming data stream. The associated type of the receive data stream in one embodiment of the present invention is determined based on the contents of the data stream itself.

The output of segment object 24 is provided to message queue 32 for transport. Message queue 32 is preferably an asynchronous message queuing system such as those known to those of skill in the art with operations of message queue 32 being modified as will be described herein according to the teachings of the present invention to provide for differenced data communications. An example of a message queue based transport system is described in U.S. patent application Ser. No. 09/191,637, now U.S. Pat. No. 6,401, 136, entitled "Methods, Systems and Computer Program Products for Synchronization of Queue to Queue Communications" which is incorporated herein by reference in its entirety. It is to be understood that message queue 32 is a queue associated with an output port or node connection to network 22 which may support message based transmissions for a variety of different data source applications 20 executing on the source computer. While operations will be described for a single data stream feeding message queue 32 for ease of understanding the present invention, it is to be understood that the operations described herein may be duplicated for additional data streams and all of the separate data streams may share a common message queue 32 which may provide the capability for proper delivery of messages at the source and destination device from different source and destination applications using known techniques for asynchronous transport using message queues. Accordingly, these aspects of message queue 32 will not be further described herein except to the extent they relate to or are modified according to the teachings of the present invention.

As will be described herein, the present invention applies data stream differencing to the data stream to reduce the volume of data transmitted over an external communication link, such as a low-bandwidth wireless link. Data stream differencing is described in U.S. patent application Ser. No. 08/852,586, now U.S. Pat. No. 5,909,569 which is incorporated herein by reference in its entirety. A data reduction technique is also described for use in client-server application environments, such as the Internet, in U.S. Pat. No. 5,754,774. These approaches use knowledge of the structure of the data stream to segment the data stream and maintain synchronized caches at the source and destination devices to allow previously transmitted segments in the data stream to be replaced by identifiers allowing the receiving device to rebuild the complete data stream from its cache of previously received segments. However, these approaches generally require synchronization between the devices and are directed to processing of a data stream between actively connected devices allowing synchronous communication.

Messages in message queue 32 are successively passed to reducing object 34 for differencing the data stream coming out of message queue 32 according to the teachings of the present invention. While for the embodiments described herein, the reducing object 34 is illustrated as operating on output messages from message queue 32 it is to be understood that the benefits of the present invention may similarly be obtained by providing a reducing object operating on the output of segment object 24 and entering reduced data stream segments into message queue 32 for transport. The reduced segments from reducing object 34 are, in turn, provided to an emitting object 36 for emitting (transmission) over network 22. As is generally known to those of skill in the art, an emitting object 36 in an asynchronous message queuing systems such as those suited for use with the present invention typically buffers a plurality of messages (segments) in a transmission buffer before transmitting the buffer contents over network 22. The size of the transmission buffer may, for example, be defined by a network protocol specifying a packet size for transmissions over the communication network 22.

Figure 2:
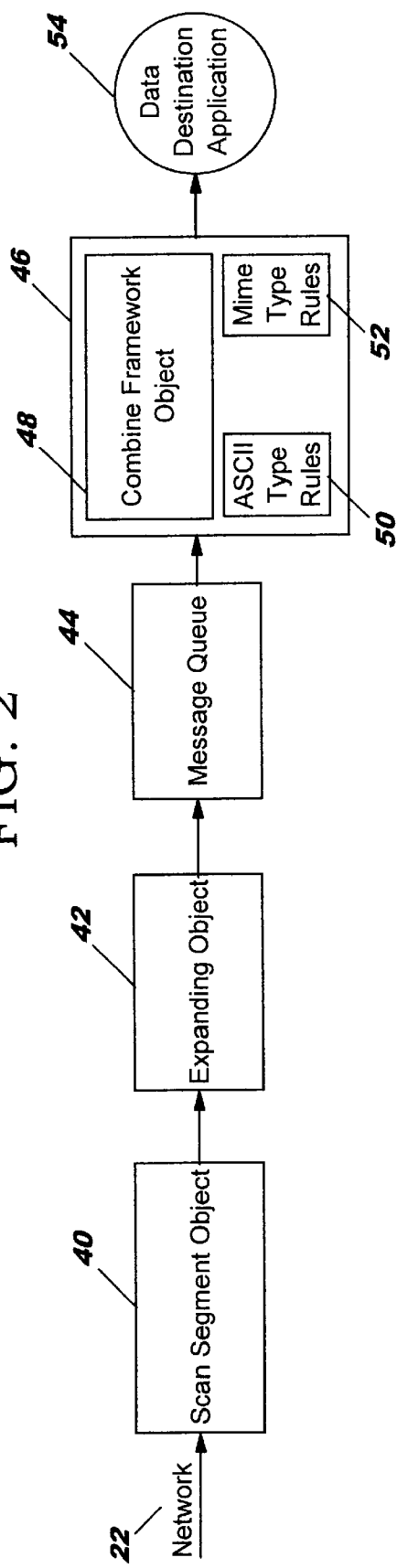
FIG. 2 is a block diagram of a communication system for differencing ongoing data communications from a destination device perspective according to one embodiment of the present invention.

Referring now to FIG. 2, a receive side system according to the teachings of the present invention will now be described. A scan segment object 40 receives a transmitted buffer containing messages transporting a data stream in a reduced segment format from network 22. As will be described further in reference to the flow charts herein, the scan segment object 40 outputs received segments to expanding object 42. The received reduced segments may contain the segment (i.e., the data) or an identifier of the segment. Expanding object 42 determines whether a received segment contains an identifier or the segment itself. If the segment contains an identifier, expanding object 42 determines whether the associated segment is available at the destination device and provides the expanded segment to message queue 44. Where the segment itself is received, the segment is directly passed to message queue 44 by expanding object 42. If a segment identifier is detected by expanding object 42 and the full segment is not available, a request for retransmission will be generated by expanding object 42 as will be described further herein. Messages from receive message queue 44 are in turn passed to combine object 46 in the illustrated embodiment. Combine object 46, like segment object 24 includes a combine framework object 48 and may include a plurality of type objects providing rules for combining associated types such as the illustrated ASCII type object 50 and MIME type object 52 which customize the combination operations of combine framework object 48 to reconstruct the data stream. The data stream from combine object 46 is then provided to data destination application 54.

Figure 3:
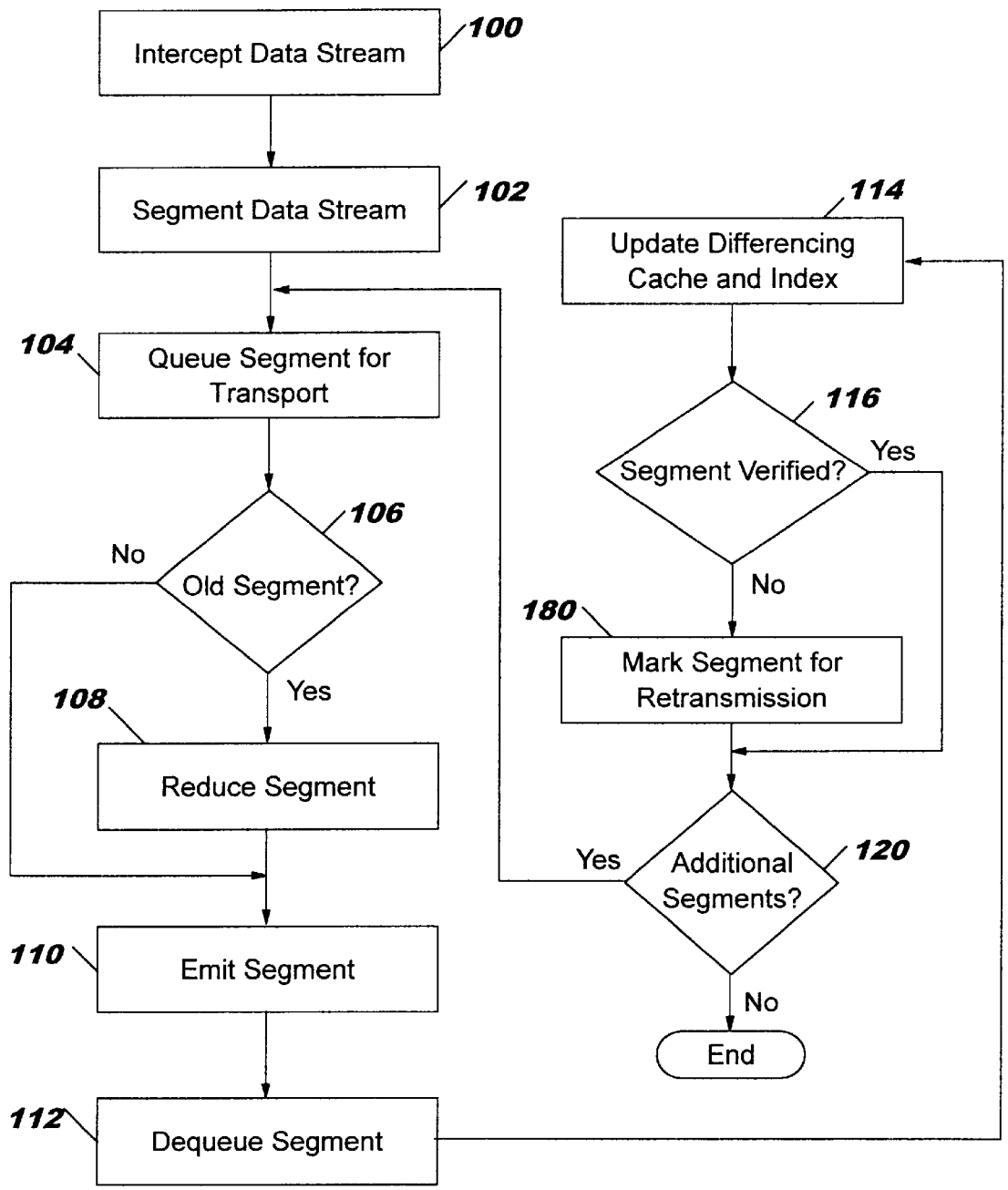
FIG. 3 is a flow chart illustrating operations carried out by a source device according to an embodiment of the present invention.

Operations for a source device for an embodiment of the present invention will now be described with reference to FIGS. 3–5. With reference to FIG. 3, at block 100 a data stream from a data source application 20 is received by the system of the present invention. The intercepted data stream has an associated type. At block 102, the received data stream is segmented as will be further described with reference to the flow chart illustration of FIG. 4. The data stream is segmented based on the associated type of a data stream. At block 104, the segments generated at block 102 are placed in the message queue 32 for transport to a destination device.

The systems, methods and computer program products of the present invention provide for data stream differencing on various types of large objects transported using asynchronous message queuing transport. Large objects can be transmitted according to the present invention using message queuing transport in at least two basic ways. The first method provides for storing the segment itself (i.e., the data) in the message queue 32. Using this approach, a receive data stream is broken into a series of smaller segments, each of which is less than or equal to the maximum message size that the message queue 32 can accommodate (for example, 32K). Each segment from the data stream is then queued for transport.

An alternative approach is to store data references in the message queue 32 rather than the data of the segment itself. In this case, a special message, typically called a symbolic link, is stored in the queue in lieu of the data of the segment itself. The symbolic link contains control information that references the actual file or copy of a file on disk which contains the segment data. Using this approach, the message queue space is not consumed with segment data but only references to the data. An example of this type of file object transfer using messaging queues is discussed in U.S. patent application No. 09/173,778 entitled Methods, Systems and Computer Program Products for Restartable Multi-Plexed File Transfers, still pending which is incorporated herein by reference as if set forth in its entirety.

Accordingly, it is to be understood that message identifiers associated with a plurality of segments are placed into the message queue 32 at block 104. The message identifiers associated with the plurality of segments may be the associated segments themselves (i.e., the data from the segment) or pointers to a location in memory where the associated segments may be found. It is further to be understood that each of the respective segments is successively processed from the message queue 32. It is also to be understood that messages not from the data stream being segmented but from a different data stream may be processed by the message queue 32 between segments of a data stream object. Accordingly, as will be described herein, segment processing operations are preferably repeated for each of the segments from the data stream.

If at block 106, it is determined that the segment pulled from the message queue for transport is an old segment (i.e., one which was previously transported), the segment is reduced to a differenced communication format at block 108. Reducing operations will be described further with reference to FIG. 5. The selected segment being processed at block 108 is reduced to a differenced communication format based upon whether it has previously been transported to provide a reduced segment. At block 110, either the segment itself or a reduced segment identifier from block 108 is emitted, i.e., added to the transmit buffer for eventual transmission over the external communication link 22. As described above, in practice, a plurality of message segments may be accumulated in a transmit buffer prior to transmission over the external communication link 22.

The reduced segment emitted at block 110, may be the segment itself or an associated identifier placed in the data stream output transmission buffer. The data stream buffer contains the data to be sent over to the network. The size of the data stream buffer is a configuration parameter typically established to provide desired network performance. Typically, the size of the data stream buffer is proportional to the transmission bandwidth and reliability of the network. However, the particulars of operation and set up of transmission buffers supporting communications using asynchronous message queuing are generally known to those of skill in the art and will not be further described herein. The respective lengths of segments may, however, if desired, be chosen according to the present invention to provide that the data stream buffer will contain a single segment, multiple segments or even only partial segments. Regardless, operations according to the present invention do not interfere with network transport as they may be implemented independent of the buffer size selected for a particular application. In any event, the data stream transmission buffer is sent over the network whenever the buffer is full or the buffer is partially filled and contains the last subject of an object, such as a file, being transported depending upon the protocol of a particular network application.

At block 112, the segment is dequeued from the message queue 32. However, according to the present invention, the segment is added to a least recently used (LRU) list at the time it is dequeued. The least recently used list tracks the relative recency of transmission of various segments having a differencing identifier, such as a data signature, as will be described further with reference to FIG. 5. Accordingly, depending upon design decisions related to cache size for storing segments and associated identifiers, the least recently used list provides for controlling cache size by deleting the least recently used segments from the differencing protocol. Adding a segment to the least recently used list on dequeuing for the illustrated embodiment of the present invention involves computing a digital signature associated with a segment and updating the differencing index with the digital signature (identifier) as well as adding the segment as the newest member of the least recently used list.

Updating of the differencing index is shown at block 114 of FIG. 3. The differencing or segment index is an index file used to support the differencing function. It preferably provides a search function at the destination device and the source device to allow the transport operations to determine whether or not a segment is still available and returns the segment's identifier so that the segment can be retrieved for expansion on the destination device. Therefore, the segment identifier is preferably the same at both the source device and the destination device. However, the message identifier used to access the segment itself by the message queue transport system need not be the same on the source and destination device. Accordingly, in addition to updating the differencing index with the digital signature (or identifier) for the segment at block 114, the differencing index also may be provided with the associated message identifier allowing access to the segment by the message queue 32 of the source device.

A differencing cache may also be updated at block 114. The differencing cache may contain the actual segment information. However, it is to be understood that the segment itself need not be separately stored in caches supporting the message queue 32 and the differencing operations of the present invention. Accordingly, for a message queue transport using a message identifier in the queue which acts as a pointer to a memory location where the message is stored, no separate differencing cache is maintained apart from the memory supporting the message queue but, instead, the differencing index is simply provided with both the digital signature (identifier) of the segment and the message identifier providing for access to the segment itself.

Updating operations at block 114 are preferably utilized in connection with a least recently used list to support discarding of segments to control the size of the differencing cache. Accordingly, where a least recently used list is used with the present invention, an identifier associated with the segment is also associated with a least recently used list and, if the differencing cache exceeds a size criteria, the least recently used segment is removed from the differencing cache. It is to be understood that the least recently used list may simply be a logical construct providing chaining between segments identified in the differencing index. For example, each entry in the index may include a pointer to the location of the index entry immediately preceding and immediately following the entry in least recently used order. The pointers to preceding and following entries may alternatively be maintained in the differencing cache. Similarly, as explained above, the differencing cache may merely be an extension of a message cache queue accessed by message identifier and the pointers to proceeding and next entries may be maintained in the messaging cache with discarding based on the least recently used order rather than immediately on dequeuing. Regardless of the approach taken, the least recently used logical associations are updated each time a segment is transmitted even if the segment is already in the differencing index and differencing cache because it was previously transmitted.

At block 116, the source device verifies that the differenced communication format of the reduced segment was known to the destination computer. Verification may, for example, be provided by receiving a message from the destination computer indicating whether the destination computer had a segment in memory corresponding to the segment identifier. Where simplicity of operation is desired, a message is only received from the destination computer if the destination computer did not have a corresponding segment in memory. Accordingly, the source computer assumes segments are verified in the absence of any message from the destination computer.

At block 118, if the segment has not been verified successfully, in other words, if a message stating that retransmission is required is received, the segment is marked for retransmission and re-queued into the message queue. On requeuing, however, the segment itself rather than the identifier associated with the segment is queued and emitted to the destination computer as the destination computer did not have a segment in memory corresponding to the previously emitted identifier. At block 120, if additional segments are available for transmission, operations return to block 104. The next segment is pulled from the message queue and operations from block 106 through 120 repeat for that segment. If another data stream is received at block 100, operations repeat as described starting at block 102 with segmenting of the new data stream for transmission.

Preferably, transmitted messages have an associated sequence number corresponding to a transmission order. To maintain the appropriate sequence in the destination computer, the retransmission request asks for retransmit with the sequence number of the segment requested for retransmission. The source computer then retrieves the segment data based on the digital signature and retransmits using the original sequence number to facilitate maintaining sequence order during combining operations at the destination computer. Furthermore, until the re-transmitted segment is received, the receive queue of the destination computer may be blocked to avoid receipt of non-contiguous segments.

Figure 4:
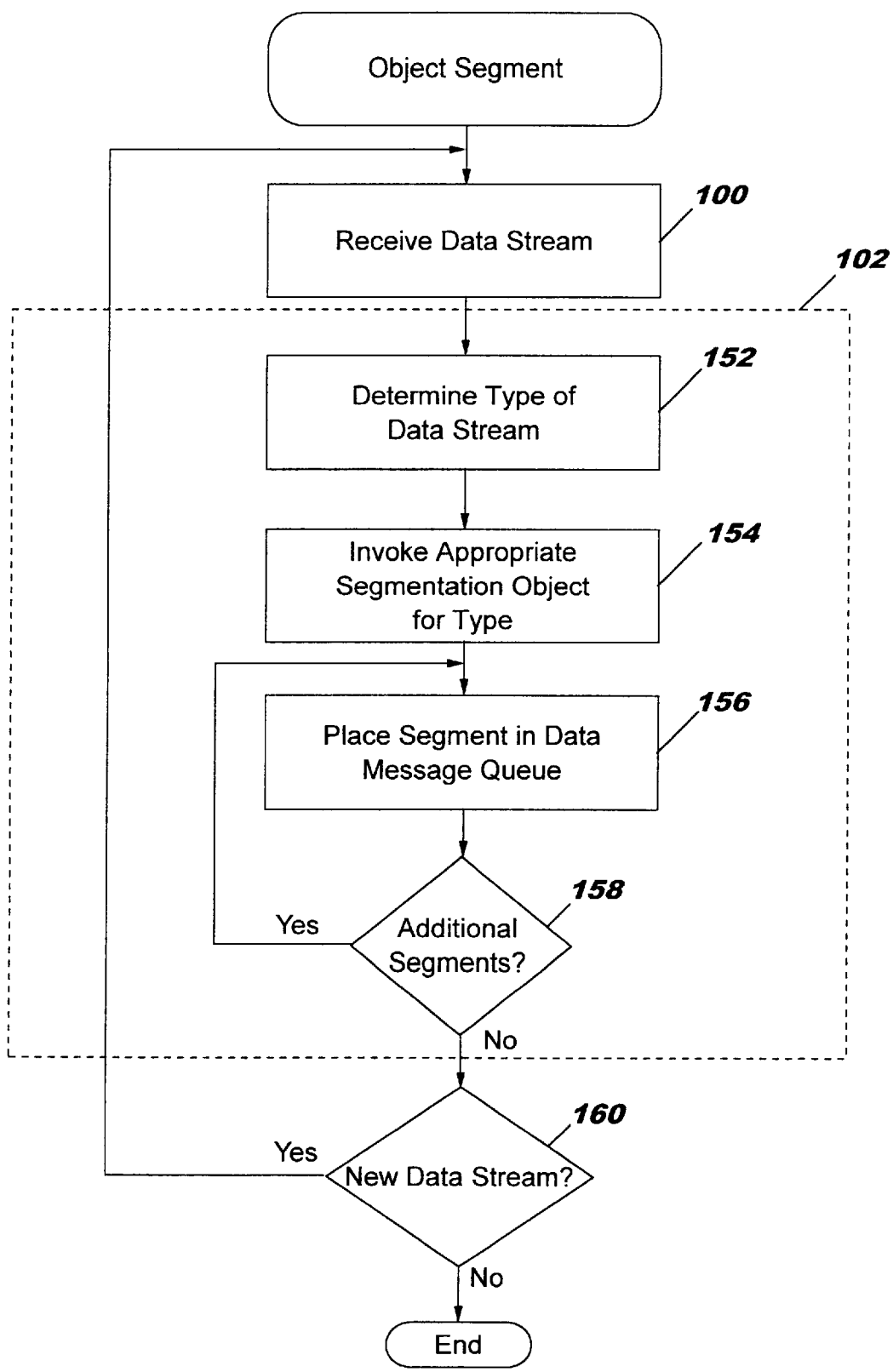
FIG. 4 is a flow chart illustrating operations carried out by a source device for segmenting a data stream according to an embodiment of the present invention.

Referring now to FIG. 4, operations for segmenting a data stream from block 102 will be further described for a particular embodiment of the present invention. The segment object receives (intercepts) a data stream as illustrated at block 100. At block 152, the segment object determines a type for the received data stream which is used to invoke the appropriate segmentation type object at block 154. For example, with reference to FIG. 1, if the data stream was an ASCII file, segment framework object 26 would recognize the type and invoke the ASCII type object 28 to segment the ASCII file data stream. This configurable characteristic of segment object 24 may be provided either by placing parameter values in the type objects 28, 30 which may be used to segment the object by segment framework object 26 or, alternatively, type objects 28, 30 may contain the actual executable code and be called by segment framework object 26 to calculate the segment boundaries for an incoming data stream. Furthermore, type objects 28 and 30 may also be provided containing parameter information which may be made available to segment framework object 26 to define the criteria used by segment framework object 26 in determining the type of an incoming data stream.

Referring again to FIG. 4, once a data stream is segmented, each segment is placed in the message queue 32 so that all segments of the segmented data stream are placed in the message queue for transmission as illustrated at blocks 156 and 158. If it is determined that a new data stream has been received, operations at blocks 100 through 158 are repeated for the new data stream (block 160).

As noted above, the way in which segments are chosen is based on an associated type according to the teachings of the present invention because these criteria may significantly influence the effectiveness of the differencing operations of the present invention. In particular, segments are preferably determined so as to increase the likelihood that they will be identically reproduced in future transmissions if the content has not changed. Accordingly, the segmentation algorithm and the means for delivering segments preferably varies by data stream type. Furthermore, the data stream may be delimited into objects, such as files, with starting and ending points in the data stream. An object segment class may be provided to maintain the state of the object being segmented. If the state is reset and a new object is received, its type is determined and an appropriate type object 28, 30 is instantiated (executed) according to the object type. For example, for Internet objects, the "MIME" type may be used to identify the object type. Other types may be used for different data streams. It is also to be understood that while the output of segment object 24 is shown as being provided to a given message queue 32, multiple message queues may exist on a source device. Accordingly, segment object 24 may be provided with the ability to recognize the target message queue from the incoming data stream from data source 20 and provide for operations as described herein using the appropriate message queue. Therefore, it is to be understood that a single segment object 24 may support a plurality of message queues 32.

Figure 5:
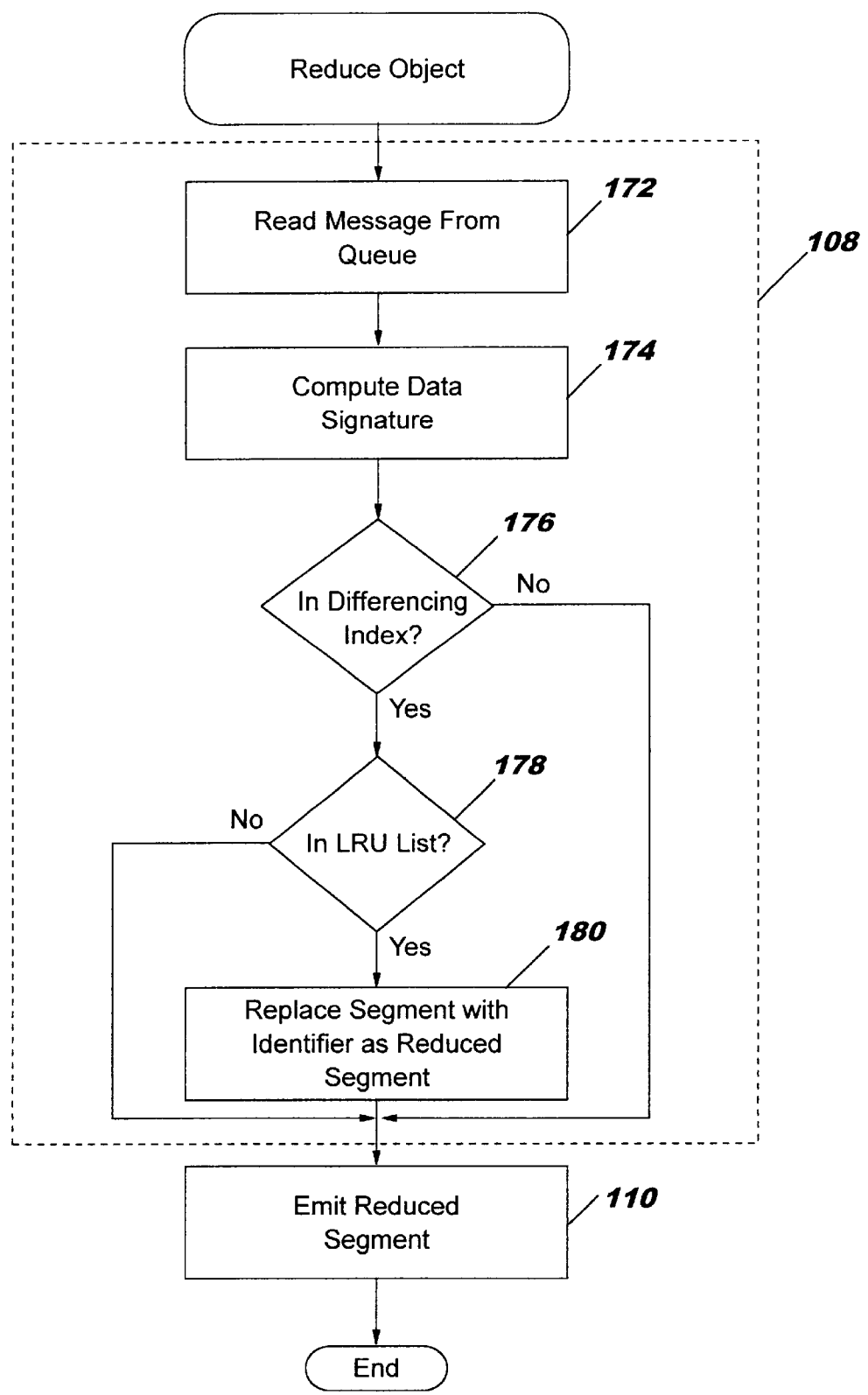
FIG. 5 is a flow chart illustrating operations carried out by a source device for reducing segments according to an embodiment of the present invention.

Referring now to FIG. 5, operations for reducing a segment from block 108 will be further described. At block 172, a message is read from the message queue 32. The data signature is then computed for the message at block 174. At block 176, the differencing index is searched to determine if the segment has been processed previously and, therefore, potentially exists in the least recently used list (block 176). If the segment's identifier (data signature) is located in the search at block 176, the least recently used list is searched to see if the segment has still been maintained in the differencing cache (block 178). If the segment is in the LRU list, a reduced segment is created by replacing the segment with its identifier (block 180). The reduced segment in the illustrated embodiment consists of the segment data signature and a segment identifier which enables the segment data to be retrieved from the least recently used list.

If the segment is not found in the least recently used list, for example, if it has been a sufficient time since it was previously transmitted that it had been deleted, the segment itself is left as the reduced segment for emitting to the data stream at block 110. The full segment format preferably consists of a small segment header followed by the segment data retrieved from the differencing cache. Whenever the segment is logically deallocated (i.e., dequeued from the message queue) it is placed on the least recently used list and a corresponding entry is inserted into the differencing index. When all the cache space has been allocated, a percentage of the messages in the least recently used list are freed.

As described above, data stream differencing typically requires a differencing cache. This cache preferably maintains a least recently used list of segments so that the older segments can be discarded and replaced with newer segments when the cache becomes full. The message queue can concurrently serve as the differencing cache by treating constructed segments from the data stream as messages and storing the dequeued messages on the least recently used list instead of returning the space for the message to free storage. For each message put on the least recently used list, its digital signature is computed and stored in the differencing index so that the segment can be retrieved by reference to its digital signature using the differencing processing. When the queue becomes full, the oldest messages are freed for use.

Figure 6:
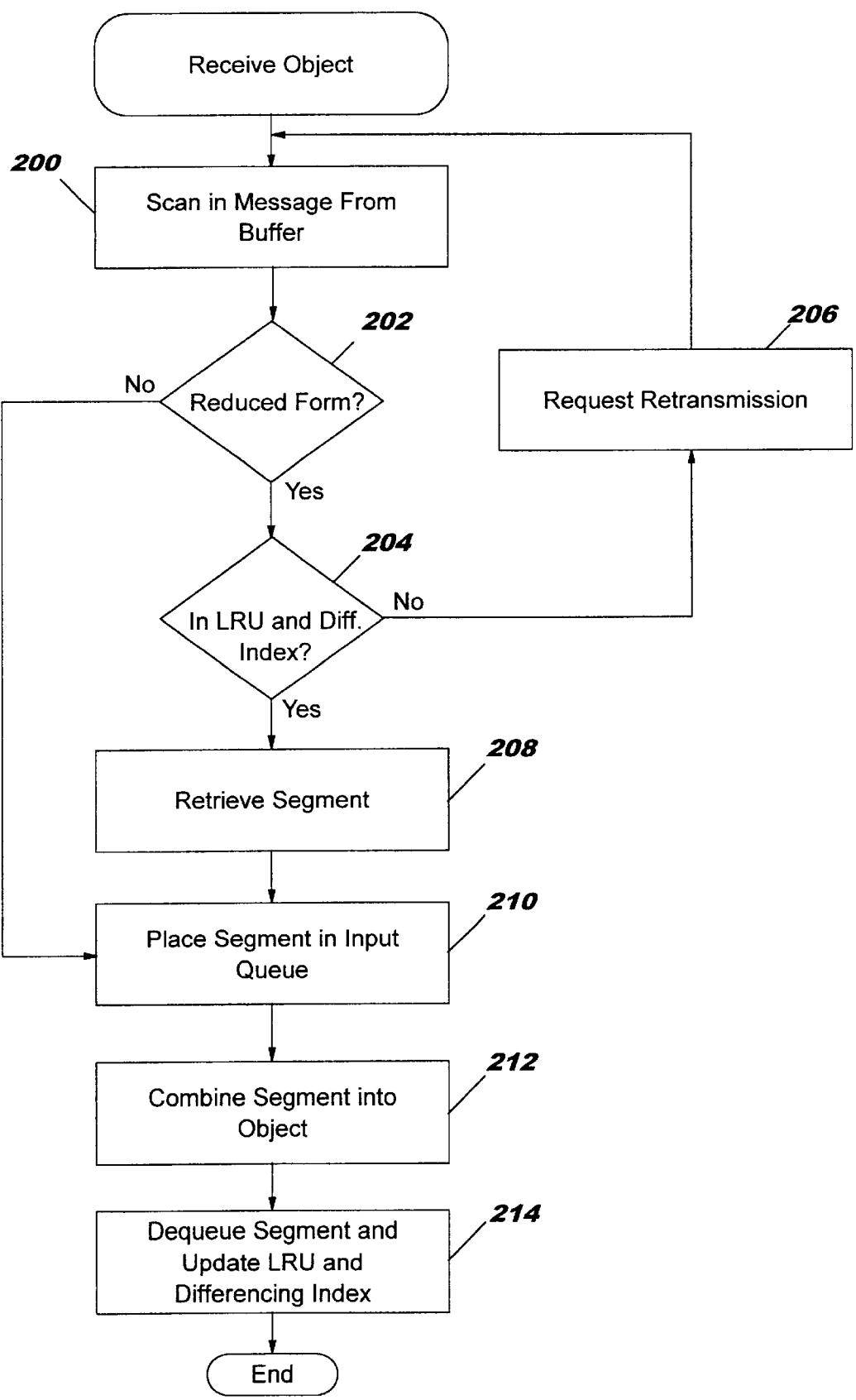
FIG. 6 is a flow chart illustrating operations carried out by a destination side device according to an embodiment of the present invention.

Receive side operations according to an embodiment of the present invention will now be described with reference to FIG. 6. At block 200, the message is scanned in from the network data stream buffer by isolating a particular message (segment) from the input data stream. At block 202, it is determined whether the received segment is in a reduced form with an identifier in lieu of the segment itself contained in the message. If the received segment is an identifier, the destination device attempts to retrieve the segment from the destination device's least recently used list. This is accomplished by using the destination device differencing index to obtain an associated message identifier at the destination computer corresponding to the received identifier (digital signature) in the reduced segment. The message identifier is then used to access the actual segment from the destination device differencing cache if it is still contained in the least recently used list.

The retrieval of the segment fails at block 204 if the appropriate entry is not found in the differencing index or in the least recently used list, in which case a message is sent to the source device indicating that the segment itself is not stored at the destination device and that the complete version of the segment must be sent rather than the digital signature (block 206). Otherwise, the segment is retrieved (block 208). Accordingly, at block 210, the segment itself is placed into the input message queue of the destination device regardless of whether it was actually received containing the segment itself or the identifier. As used herein the term "reduced segment" generally refers to the segments from reducing object 34 regardless of whether they contain an identifier or the segment data.

The retrieval operations as described with reference to blocks 204 through 208 provide various benefits utilizing the teachings of the present invention. First, by requesting retransmission if a segment is not found, there is no requirement to maintain synchronization between differencing caches of destination and source computers as was provided with the differencing techniques as discussed in the background. Furthermore, by providing a differencing index at both the destination and source device, there is no requirement to coordinate message identifiers between communicating devices in order to implement differencing according to the present invention using asynchronous message queue transport. While the data signature, which is preferably calculated based upon the content of the segment itself, is preferably shared between both destination and source devices, each device may maintain its own unique and distinct set of message identifiers with the differencing indexes providing the linkage between the two. Accordingly, the use of a differencing index allows differencing to be provided without creating additional requirements for the asynchronous message transport queue implemented in the source and destination devices.

At block 212, a sequence of segment data from the receive input message queue is read and integrated into the object type being created (such as a file). As was described with the segment object 24, the combine object 46 may be customized by object type. For example, where the data stream is delineated into an object defined as a file and the transfer operation is a file transfer, combine operations at block 212 may cause a temporary file to be allocated with each write operation causing a byte string to be written at a specified offset of the file. The last segment write may then cause the temporary file to be closed and copied to another location at the destination device. Operations for a particular embodiment of the present invention where the data stream is delineated into files and the invention is applied to file transfers will be further described with reference to FIGS. 7–10.

At block 214, operations are completed by dequeuing the segments which have been successfully combined and, as appropriate, completing updating of the destination device least recently used list and differencing index. It is to be understood that while maintenance of the differencing index and least recently used list at the destination device proceed essentially as described for the source device, there is no requirement for coordination between the respective operations except insofar as the use of a common identifier substituted in reduced segments, which is preferably a digital signature calculated based upon the contents of the segment itself. For example, a CRC may be calculated for the segment with sufficient bits provided in the CRC to insure that, for all practical purposes, the digital signature will be a unique identifier associated with a particular segment. Furthermore, there is no requirement that the least recently used list of the source and destination computer maintain the same number of cache entries. Accordingly, the destination device may have both different message identifiers and a different quantity of messages maintained in the least recently used list from the source device.

Figure 7:
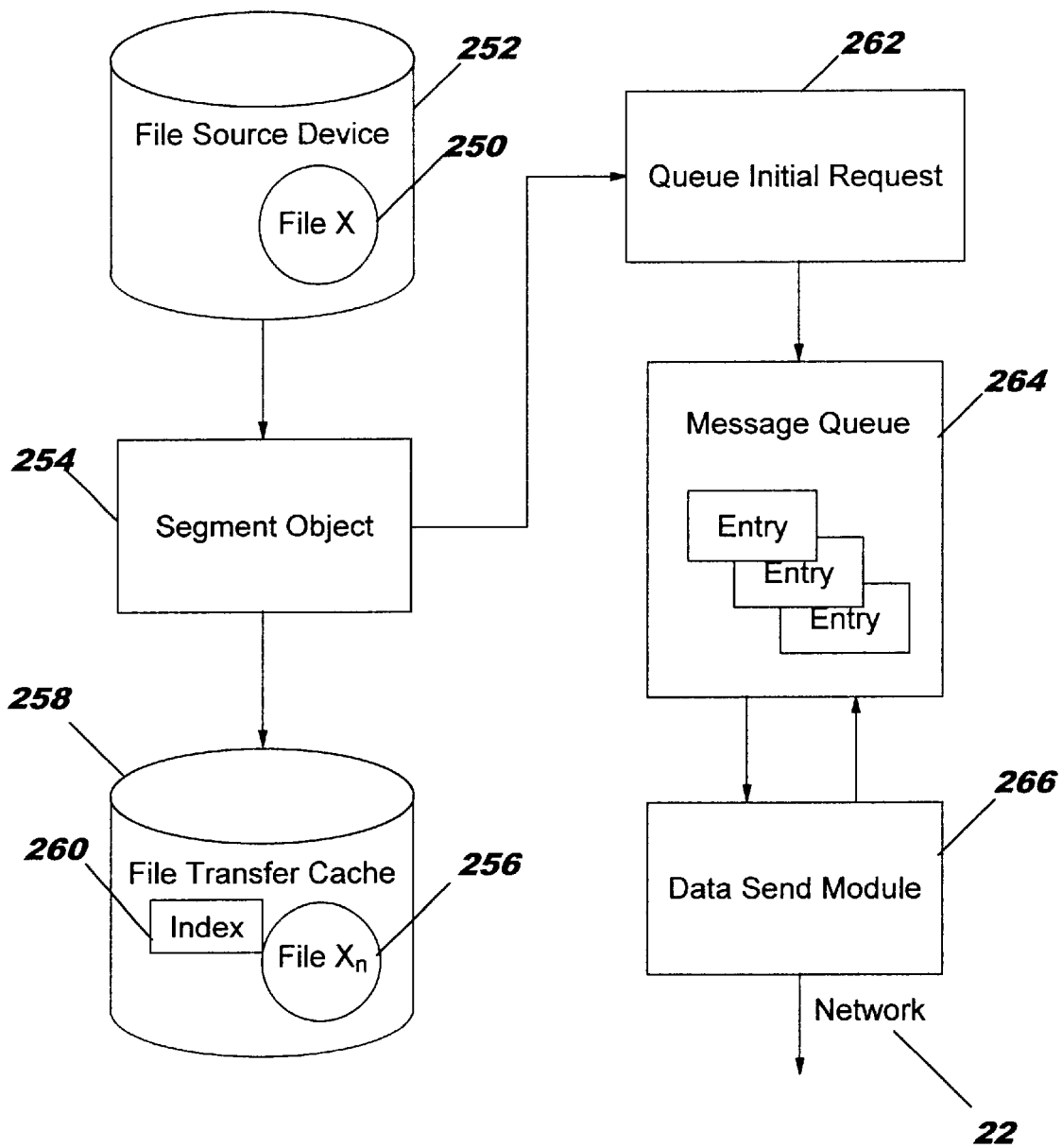
FIG. 7 is a block diagram of a communication system according to a file transfer aspect of the present invention.

Referring now to FIG. 7, file transfer aspects according to an embodiment of the present invention will now be described. For the illustrated example, a file "X" 250 is resident on a file source device 252 such as a hard drive on the source computer. Also provided is segment object 254 which, responsive to a put file (file transfer) request, places a version identified copy of file X into file transfer cache memory 258. Segment object 254 further provides the differencing index 260 associated with file $X_n$ 256 in file transfer cache 258. When a file transfer request is made, the file cache 258 is first searched to see if the current version of file X is already cached. Copy operations by the segment object 254 segment the file and add it to the cache if it is not already present in the file transfer cache 258.

Segmenting operations correspond to those previously described for the general case of data streams previously with the source file being read as a data stream, segments being identified based on associated type and the data stream being written to a target file version $X_n$ 256 on cache 258. Segment index 260 preferably includes a digital signature or other identifier computed for each segment that is the key of the index with a segment offset and length also stored. Once the segment transfers are completed, the file copy $X_n$ 256 corresponds to the current version file X.

The initial message queue request 262 is also provided by segment object 254 to initiate asynchronous message transport through message queue 264. Data send module 266 reads the messages from message queue 264 which contains message entries which identify in the file being transferred and the number of bytes already sent.

As each new message (segment) is drawn from message queue 264, a file buffer request is made to file transfer cache 258 to fill the transmit data stream buffer of data send module 266 with the next chunk of data from the file. Data is read from the file copy 256 starting at the offset value contained in the message from message queue 264 with the number of bytes read limited by the size N, of the transmit buffer (or the remaining number of bytes until the end of file). A segment and read size may be selected to match the size of the transmission buffer or a portion thereof. Data send module 266 further provides means for transmitting the buffer over network. The file may then be transmitted to the destination computer where it may be written to the target cache file at the destination computer. Accordingly, when processing for a file is complete, an identical cache copy file and index associated with the file may be provided on the destination system as well. The generation of the index counterpart to index 260 at the destination system may be determined by segmentation and computation of digital signatures at the destination system resulting in creation of a target file and its associated index. Alternatively, the data stream may be transmitted as a series of segments where each segment header contains a length field and an already computed associated identifier such as a digital signature. The segment header attributes may then be used to create the destination computer differencing index directly. The alternative approaches trade off minimizing data transfer volume with minimizing processing on the destination computer.

Figure 8:
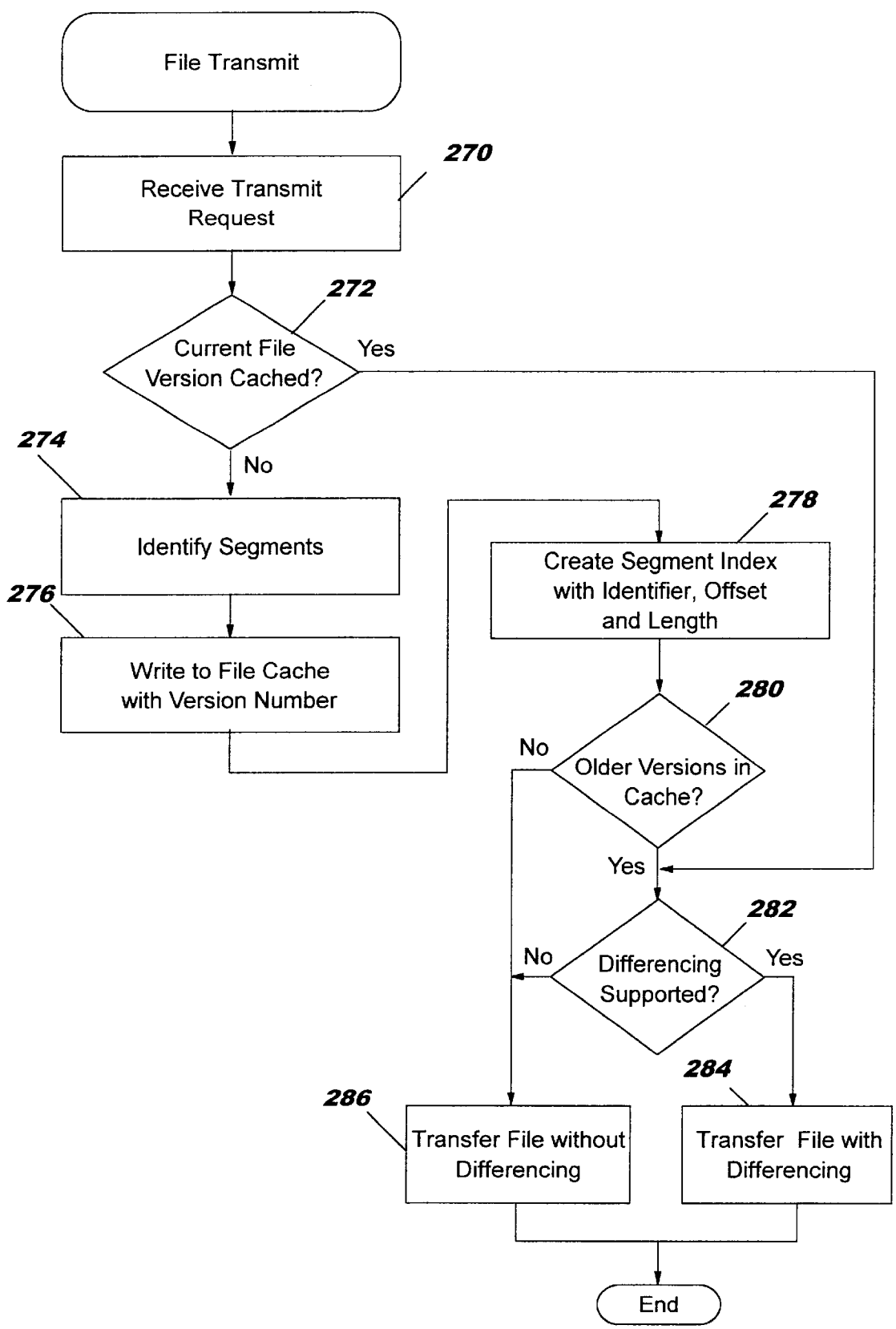
FIG. 8 is a flow chart illustrating operations carried out by a source device according to an embodiment of the file transfer aspect of the present invention.

As will be described further with reference to FIG. 8 and FIG. 9, a plurality of versions of file X may be maintained in file transfer cache 258 in order to support differencing operations according to the present invention. Multiple versions predating the current version of file X 250 are preferably maintained as the file transfer request may be to a variety of destination computers so various different destination computers may have different earlier versions of file X 250. The number of previous versions maintained in file transfer cache 258 is a design choice, the implementation of which may include limiting the number of generations maintained on the source computer. In general, file transfer cache 258 contains multiple generations of a given file starting with an original $X_0$ through the current version $X_n$. New generations of the file are generated and placed in file transfer cache 258 if the file has been modified since the last transfer request. File transfer cache 258 preferably maintains a generation list in last in, first out order of all the generations created for each named source file. Each entry in the list may contain sufficient attributes (such as, last modified date/time of the source file or CRC) to determine if it matches the current source file. A least recently used list may be maintained for all files (including all generations of any individually named source file) for use in maintaining the size of file transfer cache 258. When the file transfer cache 258 becomes full, the oldest files from the least recently used list may be deleted to free up cache space.

Also note that with digital signatures selected as identifiers which are, for all practical purposes, unique, it is not necessary to maintain entire copies of each generation of a given named source file. An entire copy of the current file data is typically maintained for future file transfer requests. However, it is sufficient to maintain indices of past generations of a file for use in differencing as will be described further herein.

Operations by the source computer for the file transfer aspects of an embodiment of the present invention will now be described with reference to FIG. 8. At block 270, a file transmit request is received. At block 272, if the current version of the file has not yet been cached (i.e., has not yet been transmitted), operations move to block 274 and segments of the file current version are identified based on an associated type as described previously. The current version of the file is then copied to a file cache 258 responsive to the file transfer request as shown at block 276. At block 278, an identifier (such as a data signature) for each of the file segments associated with the current version of the file is calculated and placed in a segmenting (differencing) index. As described with reference to FIG. 7, this segmenting index further includes the offset defining the start point of the segment within the file and the length of the segment over which the identifier has been calculated.

At block 280, the source computer determines if a previous version of the source file having associated file segments is available to the source computer. At block 282, the source computer determines if differencing is supported by determining if the destination computer has a previous version of the files to be transferred available. If differencing is supported, the transfer of the file takes place using differencing (block 284). Otherwise, the transfer takes place without differencing (block 286).

Operations at block 282, may include transmitting an identification of previously saved versions of the file to the destination computer and receiving a responsive message from a destination computer containing an indication of whether any of the previously saved versions of the file are available to the destination computer. If any previous version is available to the destination computer, then differencing file transfer is supported. Where a plurality of different earlier generation versions are available, the responsive message from the destination computer preferably identifies which of the previous versions of the file to use for differencing purposes after which operations will proceed as described herein using the selected previous version of the file. A response may be provided by the destination computer even if it has no other copies such as a "null" response to notify the source computer to proceed with transfer. Where a null is received, the source computer will set a state variable indicating that differencing cannot be used and proceed accordingly.

Figure 9:
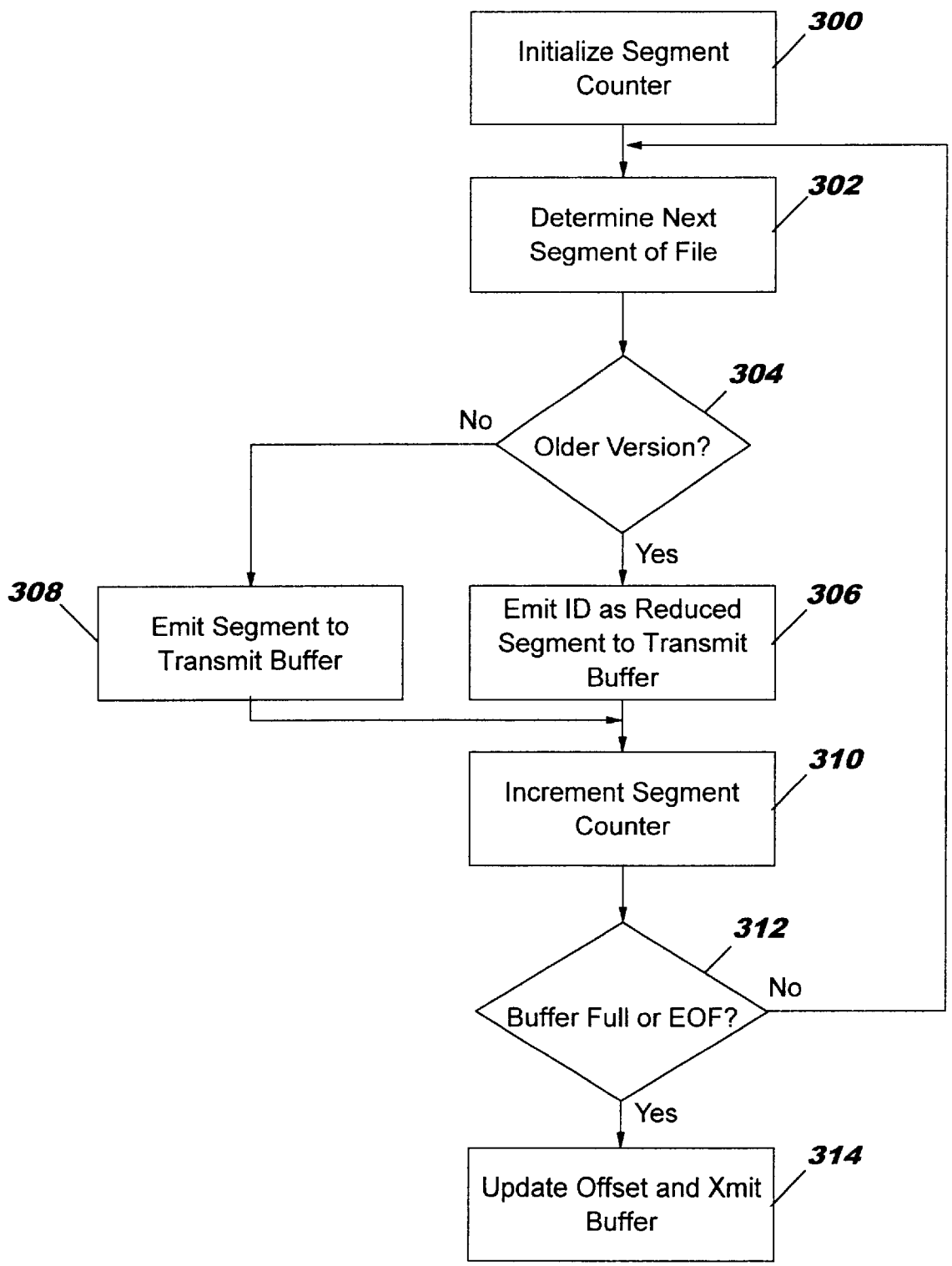
FIG. 9 is a flow chart illustrating operations carried out by a source device in segmenting a file according to an embodiment of the file transfer aspect of the present invention.

Segmenting operations for a file transfer are now illustrated for a particular embodiment with reference to FIG. 9. At block 300, a segment counter is initialized. The counter relates to the message queue format previously discussed providing an offset location. This feature is provided because message size and segments may be limited and the file transfers take place using asynchronous operation. In other words, each time a new message put file request is drawn from the message queue, the transport queue is not assumed to remember where it had last operated on that file since it may have had messages processed from unrelated data streams between two portions of the file transfer as described herein. The initialized segment counter simply establishes the zero reference point for incrementing the offset for subsequent message transmissions required to complete transfer of the entire file. The counter will be incremented as will be described herein. In any event, for ongoing operations at block 302, the next segment of the file is determined.

At block 304, the segment index 260 for the previous version of the named file which is being used for differencing is searched to determine if it contains a matching (same identifier/digital signature) corresponding to the value of the version being transferred. This comparison is accomplished by use of the associated segment indexes. Comparison operations at block 304 for each segment identifier from the file to be transmitted preferably includes a search through the segment index of the older generation file independent of position within the index. In other words, the segment index of the older generation file version may be repeatedly tested for each segment entry by entry until a match is located or all of the associated file segments have been tested compelling the conclusion that no match is available. If a match is encountered at block 304, the identifier of the segment is emitted as a reduced segment to the transmit buffer (block 306). Otherwise, the segment data is emitted (block 308).

It is to be understood that, as with the previous discussion of message queues, where the file segment itself is to be emitted because no older version is available for differencing, a message identifier may be placed in the message queue requesting transfer of the first file segment. The message identifier may simply provide a pointer to a cache location where the message itself is stored. Placing the segment identifier, such as a data signature, along with the offset, and length, in message queue 264 acts as a match indication to data send module 266 providing the necessary information to allow data send module 266 to locate a matching associated file segment identifier for substitution in lieu of the segment itself.

Note that, as with the previous discussion, the replacing of segment data with an identifier for the emitted reduced segment may be provided on the input or output end of the message queue. For the illustrated embodiment of the file transfer aspects of the present invention utilizing a digital signature, offset and length from the message queue, the differencing operations occur after a message is drawn from the message queue stack for processing by data send module 266 which, in turn, initiates the necessary comparison operations by accessing the respective file to be transferred and previous version in file transfer cache 258 directly without further involvement of message queue 264. If no matching older version is found, the segment itself rather than the identifier is emitted as the reduced segment for transmission via the transmit buffer.

The segment counter is then incremented at block 310 by the segment length. If the transmit buffer is not full or an end of file has not been detected, operations return from block 312 to block 302. If the transmit buffer is full, at block 314, the offset is updated and the transfer file request is re-queued to allow the transmission buffer to be output by data send module 266 on external communication link 22. When a new file is encountered, the transmit buffer may be immediately processed or, alternatively, the message queue may be allowed to continue operations to continue filling the transmit buffer with data streams from other sources.

Figure 10:
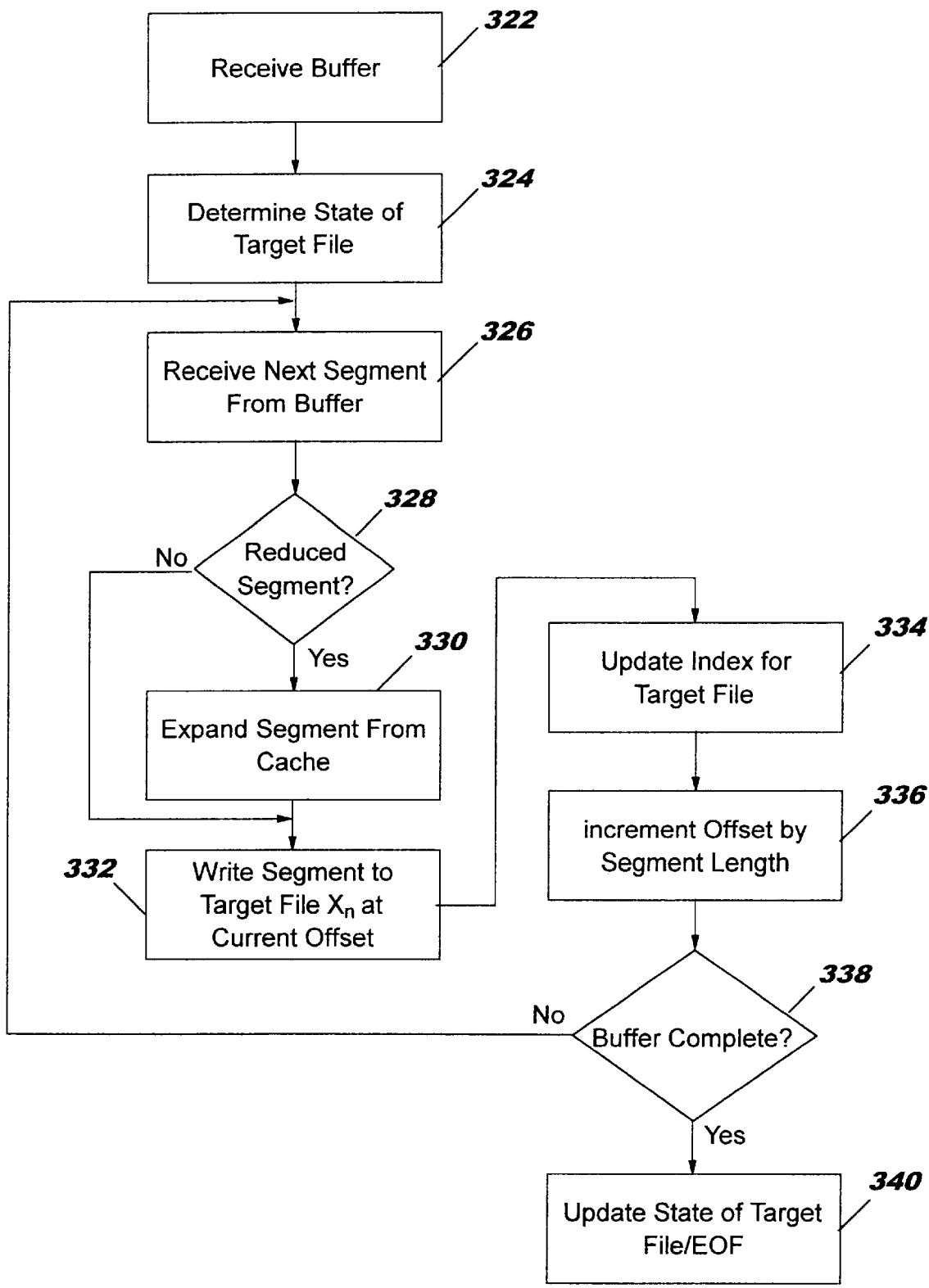
FIG. 10 is a flow chart illustrating operations carried out by a destination device according to an embodiment of the file transfer aspect of the present invention.

Receive side operations at a destination computer for an embodiment of the file transfer aspects of the present invention will now be described with reference to FIG. 10. At block 322, a file transfer transmission buffer is received at the destination computer. The state of the target file being created is then accessed at the destination computer with reference to control information in the transmission buffer (block 324). The next segment is then received from the buffer (block 326). If the segment is determined to contain an identifier rather than the underlying segment at block 328, the segment is expanded by retrieving the underlying segment information from the destination computer differencing cache (block 330). In either case, at block 332, the received segment, rather than an identifier associated with a segment, is written to the target file on the destination computer at the current offset value.

At block 334, the associated index file at the destination computer for the target file is updated in a manner analogous to that described for the source side operations in FIG. 9. This allows the creation of a reference previous generation file at the destination computer for use in differencing with the index being used to implement segment expansion as described with reference to blocks 328 and 330.

At block 336, the target file offset is incremented by the received segment length. If additional segments are still contained in the receive buffer (block 338), operations return and resume with the next segment from the buffer starting at block 326. Once the last segment has been processed (i.e., and end of file has been encountered), the file transmission is complete. Accordingly, the file can be closed out at block 340 when an end of file is detected (block 338) even if there is additional data to process still remaining in the received buffer. Otherwise, if the complete buffer has been processed without detecting an end of file indication, the state information for the target file (i.e., values reflecting the portion of the file already received such as an offset) is saved (block 340) in anticipation of additional data to be received in a subsequent receive buffer at which time operations will proceed as described starting at block 322 of FIG. 10.

It is to be understood that differencing operations as described according to the present invention herein, could provide for greatly reduced volume of traffic transported between two computers over an external communication link where various versions of an object or segments of an object are transmitted between the devices. By implementing a differencing mechanism and coordination with asynchronous message queuing transport that handles a wide variety of object types, differencing capability may be applied to "occasionally" connected and wireless applications across many types of data streams. Examples of communication applications benefitting from the operations according to the present invention include software distribution where only updated members of a package may be sent on refreshes, editorial changes in which a recipient makes comments or changes to a received note, memo or document in which only the change/new lines may be sent even though the recipient returns the entire updated object, and updating of tables where a new parts list is downloaded to all clients and only the added/changed entries are actually sent over the external communication link.

FIGS. 3–6 and 8–10 are flow chart illustrations of methods and systems according to the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

While the external communications link 22 used with the present invention may be of any appropriate type, the benefits of the present invention are most notable where external communication link 22 includes at least one low-speed communication leg such as a wireless external communication link. It is further to be understood that the external communication links 22 will typically be a single physical line or wireless channel carrying two way communications. The link may be provided as a network. Accordingly, the external communication link between a source computer and a destination computer has generally been referred to herein by reference to network 22.

The various caches and indexes described herein have been generally described as resident on the source and destination computers respectively. However, they need only be accessible to the computers on the same side of the external communication link. Furthermore, while various objects, such as those in FIGS. 1, 2 and 7 are illustrated as distinct, they may be combined into a common application in various manners using programming techniques known to those of skill in the art. They may also be distributed across devices on a network with the source devices communicating over an external communication link with the destination devices.

As used herein, the term "cache" refers to a storage device such as, for example, RAM, EEPROM, DRAM, shift registers or other storage means such as are known to those of ordinary skill in this art. As will further be appreciated by one of skill in the art, caches may also be implemented with mass storage such as hard disk, read/write CD-ROMs, optical disk, or other storage technologies.

Optionally, traditional data compression techniques (for example, LZ arithmetic encoding) may be applied to the differenced communication protocol data stream to further reduce data volume for transmission over external communication link 22 so long as a corresponding data decompression interface is provided at the destination device.

In the drawings and specification, there have been disclosed typical preferred embodiments of the invention and, although specific terms are employed, these terms are used in a generic and descriptive sense only and not for purposes of limitation, the scope of the invention being set forth in the following claims:

That which is claimed is:

1. A method for transferring a file from a source computer to a destination computer using a message queue, the method comprising the steps of:

copying a current version of the file to a file cache responsive to a file transfer request;

defining file segments associated with the current version;

determining if a previous version of the file having associated file segments is available to the source computer;

determining if the destination computer has a previous version of the file available;

comparing a first file segment of the current version with the associated file segments of the previous version;

placing a message identifier for the first file segment in the message queue to request transfer of the first file segment if no matching associated file segments of the previous version are located;

placing a match indication in the message queue for transfer if a matching associated file segment is located.

2. A method according to claim 1 further comprising the step of calculating an identifier for each of the file segments associated with the current version and placing the calculated identifiers in a segmenting index and wherein the comparing step comprises the step of comparing one of the calculated identifiers to a reference identifier based on one of the associated file segments of the previous version and wherein said comparing step is repeated until at least one of a match is located or all the associated file segments have been tested.

3. A method according to claim 2 wherein the step of comparing one of the calculated identifiers is repeated for each of the file segments of the current version.

4. A method according to claim 2 wherein the step of calculating an identifier for each of the file segments associated with the current version and placing the calculated identifiers in a segmenting index further comprises the step of calculating a segment length for each of the file segments and placing the segment lengths in the segmenting index associated with the calculated identifiers.

5. A method according to claim 1 wherein the step of determining if the destination computer has a previous version of the file available comprises the steps of:

transmitting an identification of the previous version of the file to the destination computer; and receiving a message from the destination computer containing an indication of whether the previous version of the file is available to the destination computer.

6. A method according to claim 5 wherein a plurality of previous versions are available to the source computer and wherein the transmitting step comprises the step of transmitting identifications of the plurality of previous versions and the receiving a message step comprises the step of receiving a message from the destination computer containing an indication of one of the plurality of previous versions of the file which is available to the destination computer and wherein the comparing step uses the one of the plurality of previous versions which is available to the destination computer.

7. A system for transferring a file from a source computer to a destination computer using a message queue, the system comprising:

means for copying a current version of the file to a file cache responsive to a file transfer request;

means for defining file segments associated with the current version;

means for determining if a previous version of the file having associated file segments is available to the source computer;

means for determining if the destination computer has a previous version of the file available;

means for comparing a first file segment of the current version with the associated file segments of the previous version;

means for placing a message identifier for the first file segment in the message queue to request transfer of the first file segment if no matching associated file segments of the previous version are located; and means for placing a match indication in the message queue for transfer if a matching associated file Segment is located.

8. A system according to claim 7 further comprising means for calculating an identifier for each of the file segments associated with the current version and placing the calculated identifiers in a segmenting index and wherein the means for comparing comprises means for comparing one of the calculated identifiers to a reference identifier based on one of the associated file segments of the previous version and wherein the means for comparing comprises means for repeating comparing until at least one of a match is located or all the associated file segments have been tested.

9. A system according to claim 8 wherein the means for calculating an identifier for each of the file segments associated with the current version and placing the calculated identifiers in a segmenting index further comprises means for calculating a segment length for each of the file segments and placing the segment lengths in the segmenting index associated with the calculated identifiers.

10. A system according to claim 7 wherein the means for determining if the destination computer has a previous version of the file available comprises:

means for transmitting an identification of the previous version of the file to the destination computer; and means for receiving a message from the destination computer containing an indication of whether the previous version of the file is available to the destination computer.

11. A system according to claim 10 wherein a plurality of previous versions are available to the source computer and wherein the means for transmitting comprises means for transmitting identifications of the plurality of previous versions and wherein the means for receiving a message comprises means for receiving a message from the destination computer containing an indication of one of the plurality of previous versions of the file which is available to the destination computer and wherein the means for comparing uses the one of the plurality of previous versions which is available to the destination computer.

12. A computer program product for transferring a file from a source computer to a destination computer using a message queue, the computer program product comprising:

a computer-readable storage medium having computer-readable program code means embodied in said medium, said computer-readable program code means comprising:

computer readable program code means for copying a current version of the file to a file cache responsive to a file transfer request;

computer readable program code means for defining file segments associated with the current version;

computer readable program code means for determining if a previous version of the file having associated file segments is available to the source computer;

computer readable program code means for determining if the destination computer has a previous version of the file available;

computer readable program code means for comparing a first file segment of the current version with the associated file segments of the previous version;

computer readable program code means for placing a message identifier for the first file segment in the message queue to request transfer of the first file segment if no matching associated file segments of the previous version are located; and computer readable program code means for placing a match indication in the message queue for transfer if a matching associated file segment is located.

13. A system according to claim 12 further comprising computer readable program code means for calculating an identifier for each of the file segments associated with the current version and placing the calculated identifiers in a segmenting index and wherein the computer readable program code means for comparing comprises computer readable program code means for comparing one of the calculated identifiers to a reference identifier based on one of the associated file segments of the previous version and wherein the computer readable program code means for comparing comprises computer readable program code means for repeating comparing until at least one of a match is located or all the associated file segments have been tested.

14. A system according to claim 13 wherein the computer readable program code means for calculating an identifier for each of the file segments associated with the current version and placing the calculated identifiers in a segmenting index further comprises computer readable program code means for calculating a segment length for each of the file segments and placing the segment lengths in the segmenting index associated with the calculated identifiers.

15. A system according to claim 12 wherein the computer readable program code means for determining if the destination computer has a previous version of the file available comprises:

computer readable program code means for transmitting an identification of the previous version of the file to the destination computer; and computer readable program code means for receiving a message from the destination computer containing an indication of whether the previous version of the file is available to the destination computer.

16. A system according to claim 15 wherein a plurality of previous versions are available to the source computer and wherein the computer readable program code means for transmitting comprises computer readable program code means for transmitting identifications of the plurality of previous versions and wherein the computer readable program code means for receiving a message comprises computer readable program code means for receiving a message from the destination computer containing an indication of one of the plurality of previous versions of the file which is available to the destination computer and wherein the computer readable program code means for comparing uses the one of the plurality of previous versions which is available to the destination computer.

* * * * *